INVENTOR.
JOHN A. RIORDAN
BY
Anderson & Mueller
ATTORNEYS

Patented May 20, 1952

2,597,376

UNITED STATES PATENT OFFICE 2,597,376

FLYWHEEL TOOL

John A. Riordan, Denver, Colo., assignor to James T. Clark, Fort Morgan, Colo.

Application February 14, 1950, Serial No. 144,095

10 Claims. (Cl. 81—90)

1

This invention relates to improvements in devices for manually rotating engines and more particularly to a tool adapted to detachably engage the flywheel ring gear thereof.

In the assembly and disassembly or repair of engines, such as automobile engines, it becomes necessary to rotate the crankshaft to position various operative parts. If the flywheel is readily accessible, as it is on many types of engines, rotation of the crankshaft is effected by grasping the rim of the flywheel and turning it by hand. This is objectionable since the sharp edges of the teeth may cut the mechanic's hands, and in cases where the engine is unduly stiff owing to tight bearings, or other moving parts, there is often insufficient leverage available at the rim of the flywheel to rotate it.

The principal object of the invention is to provide a tool which may be readily attached and detached to the flywheel starter or ring gear which forms a lever by which the flywheel may be rotated.

Another object is to provide the tool with sufficient adjustment so that it may be applied to ring gears of various diameters and/or various pitch of teeth thereon.

Another object is to provide a tool with which the flywheel may be rotated in either direction after it has been applied thereto.

Another object is to provide a tool which may be applied to or removed from the ring gear teeth by a radial movement relative to the flywheel.

Further objects are to provide a tool which is simple in construction, has wide versatility of use, may be economically manufactured, is rugged in construction, and efficient in operation.

Still further objects, advantages, and salient features will become more apparent from a consideration of the description to follow, the appended claims, and the accompanying drawing, in which:

2

Figures 1, 2, 3, 3A, 4, 5, 6, 7:
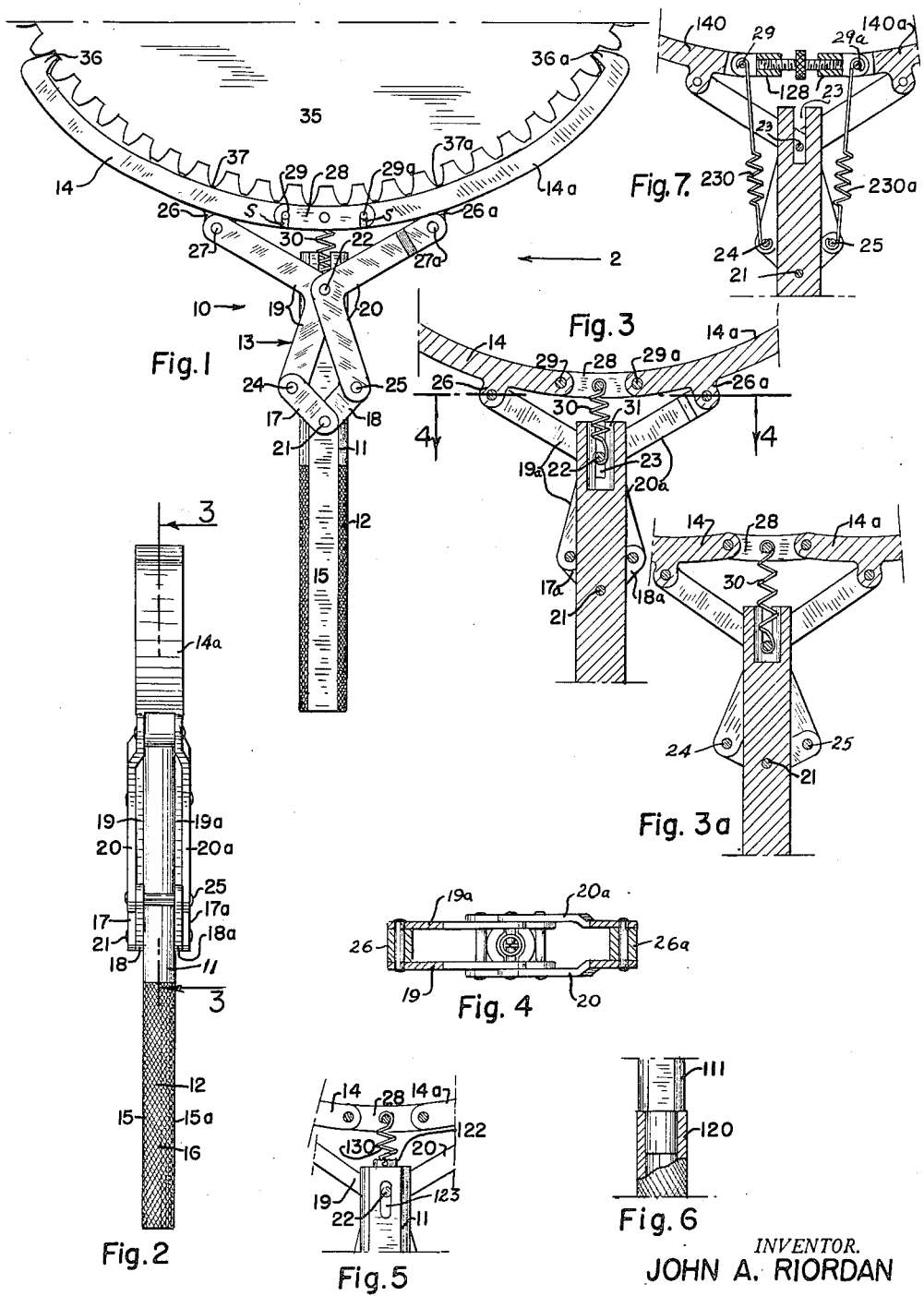
Figure 1 is a side elevation of the subject of the invention shown in its position of use attached to an engine ring gear.
Figure 2 is a side elevation thereof as viewed in the direction of arrow 2, Figure 1.
Figure 3 is a section taken on line 3—3, Figure 2.
Figure 3a is a similar section showing the various parts in another position of adjustment.
Figure 4 is a section taken on line 4—4, Figure 3.
Figure 5 is a fragmentary side elevation, portions being broken away, showing a modification.
Figure 6 is a similar view showing another modification.

Figure 7 is a view similar to Figure 3 showing another modification.

Referring in detail to the drawing, the tool 10 comprises, in general, an elongated shank member 11 having a handle 12 at one end thereof, a linkage system 13, operatively associated with the shank member, and a pair of arms 14, 14a pivotally secured to upper ends of the linkage system.

Shank 11 comprises a cylindrical piece of bar stock which has flattened opposed sides 15, 15a, and knurling 16 on the lower portion to facilitate gripping the device.

The linkage system 13 comprises links 17, 18, 19, 20, on one side of shank 11 and links 17a, 18a, 19a, 20a on the other side. A pin 21 extends through the shank and forms a pivot for the lower ends of links 17, 18, on one side of the shank, and links 17a, 18a on the other side. Links 19, 19a and 20, 20a are L-shaped and movably secured to the shank by pin 22 which is axially slideable in a slot 23, these links also being pivotally supported by pin 22. The lower ends of links 19, 19a are pivotally connected by pin 24 to the upper ends of links 17, 17a, respectively, and the lower ends of links 20, 20a are similarly connected by pin 25 to the upper ends of links 18, 18a, respectively.

Arm 14 is provided with a lug 26 disposed between the upper ends of links 19, 19a and pivotally secured thereto by a pin 27. Arm 14a is identical to arm 14 and is similarly secured to links 20, 20a by a pin 27a extending through its lug 26a.

Links 28 having slots S therein are pivotally connected at their ends to the adjacent inner ends of arms 14, 14a by pivot pins 29, 29a, respectively. A tension spring 30 has one end connected to the links and its other end connected to pin 22, a suitable hole 31 being provided in the upper end of the shank to receive the spring. When the tool is not in use, spring 30 urges pins 24, 25 upwardly and toward each other to a position where they abut the shank, as shown in Figure 3, thus forming stops for limiting movement of the linkage system in one direction.

In applying the tool to a flywheel ring gear 35, as shown in Figure 1, the tool is forced radially against the teeth thereof which moves the outer ends of arms 14, 14a downwardly until tooth engaging jaws 36, 36a engage teeth of the flywheel. The arms are preferably shaped so that when the tool is in the position shown in Figure 1, each arm will abut the outer ends of flywheel teeth at points near the inner ends of the arms as indicated by reference characters 37, 37a. When so positioned on the flywheel the latter may be rotated in either direction, depending upon the direction of the force applied to the handle 15. When it is desired to remove the tool from the flywheel, it is pulled radially therefrom, jaws 36, 36a disengaging from the flywheel teeth.

In Figure 5 a modification is shown wherein slot 123 terminates below the upper end of shank 11, and the upper end is provided with a projection 122 to which spring 130 is secured.

In Figure 6 another modification is shown wherein the handle 120 on shank 111 is tubular, being secured to a circular portion on the lower end of the shank.

In Figure 7 link 128 is formed as a turnbuckle so that it may be adjusted in length, thereby adjusting the distance between jaws 36, 36a. Springs 230, 230a are employed, these extending between pins 29, 29a and pins 24, 25, respectively.

The slots S in links 28 permit disconnection of the links from pins 29, 29a by moving them upwardly against the urge of the spring. After being disconnected, arms 14, 14a may be folded so that their outer ends lie adjacent the handle thus reducing the overall size of the tool and facilitating storage thereof in the mechanic's tool kit. It is apparent that the same construction may be employed in the various other figures.

Having described the invention, what I claim as new is:

1. A device for rotating flywheels of the type having a ring gear thereon, comprising; an elongated shank having a handle at one end thereof, a linkage system having pivot means disposed adjacent the other end of said shank constrained to move to various distances from the axis of the shank at opposite sides thereof and in the same perpendicular planes to said axis, a pair of oppositely extending arms, each having a tooth engaging jaw at its outer end, each arm being pivoted near its inner end to one of said pivot means, and link means extending between and pivotally connected at the ends thereof to the inner ends of the arms.

2. A device in accordance with claim 1 wherein said arms are shaped relative to the flywheel to provide abutment means thereon, inwardly of each jaw, for engagement with teeth of the flywheel.

3. A device in accordance with claim 1 wherein each arm is provided with a portion extending inwardly from said pivot means, the link means extending between the portions.

4. A device in accordance with claim 1 wherein said linkage system supports said pivot means at each side of the shank by pairs of links pivotally secured at one end thereof to said pivot means, said pairs of links being pivotally secured to and axially slideable on said shank intermediate their ends, and pivotally secured at their other ends to the ends of other pairs of links, the latter having other ends pivotally secured to the shank.

5. A device in accordance with claim 4 wherein the first named pairs of links are provided with common pivot means at the point intermediate their ends where they are pivotally secured to and axially slideable on said shank.

6. A device for rotating flywheels, of the type having a ring gear thereon, comprising; an elongated shank having a handle at one end thereof, a pair of links extending outwardly from the shank on each side thereof, the inner ends of both pairs being pivotally connected to the shank by pivot means axially slideable relative thereto, a pair of outwardly extending arms, each having a tooth engaging jaw at its outer end, pivotally secured intermediate their ends to the outer ends of each of the pairs of links, resilient means for urging said jaws toward each other, and means for constraining the pairs of links, on opposite sides of the shank, to identical conjoint movement relative to the shank.

7. A device in accordance with claim 6 wherein the inner ends of said arms are pivotally connected to ends of a link extending therebetween.

8. A device in accordance with claim 7 wherein said link is adjustable in length.

9. A device in accordance with claim 7 wherein said link is detachably connected to the inner ends of said arms, whereby the arms may be folded along the sides of said shank.

10. A device for rotating a gear member having peripheral gear teeth thereon, comprising; a pair of rigid oppositely extending elongated arms, each arm having a gear tooth engaging jaw at its outer end, link means interposed between and pivotally connected at the ends thereof to the inner ends of the arms, the arms and interposed link means forming a series connected unit of a shape to substantially conform to the periphery of the gear member, a leverage member, and means connecting each arm to the leverage member.

JOHN A. RIORDAN.

REFERENCES CITED

The following references are of record in the file of this patent:

UNITED STATES PATENTS

| Number | Name | Date |
|---|---|---|
| 876,213 | Moore | Jan. 7, 1908 |
| 1,098,569 | Griffith | June 2, 1914 |
| 1,384,684 | Watkins | July 12, 1921 |
| 1,727,245 | Miller | Sept. 3, 1929 |
| 2,259,922 | Bohlander | Oct. 21, 1941 |
| 2,282,608 | Rempel | May 12, 1942 |

FOREIGN PATENTS

| Number | Country | Date |
|---|---|---|
| 24,903 | Sweden | June 13, 1908 |